United States Patent [19]
Hemphill

[11] Patent No.: US 6,282,512 B1
[45] Date of Patent: Aug. 28, 2001

(54) ENHANCEMENT OF MARKUP LANGUAGE PAGES TO SUPPORT SPOKEN QUERIES

(75) Inventor: Charles T. Hemphill, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/235,123

(22) Filed: Jan. 21, 1999

Related U.S. Application Data (60) Provisional application No. 60/073,826, filed on Feb. 5, 1998.

(51) Int. Cl.[7] .................................................. G10L 15/22
(52) U.S. Cl. .......................................... 704/270.1; 704/275
(58) Field of Search .................................... 704/270, 275, 704/200, 272, 270.1

(56) References Cited

U.S. PATENT DOCUMENTS

| | | | |
|---|---|---|---|
| 5,890,123 | * 3/1999 | Brown et al. | 704/275 |
| 5,926,789 | * 7/1999 | Barbara et al. | 704/275 |
| 5,983,176 | * 11/1999 | Hoffert et al. | 704/233 |
| 5,983,190 | * 11/1999 | Trower, II et al. | 704/276 |
| 6,101,472 | * 8/2000 | Giangarra et al. | 704/275 |

OTHER PUBLICATIONS

IEEE Multimedia. Hemphill et al., "Speech Aware Multimedia". pp. 74–78. Spring 1996.*
IEEE Expert. Flammia, "Almost there: a new medium on the Web". pp. 85–86. Jun. 1996.*

* cited by examiner

Primary Examiner—Richemond Dorvil
(74) Attorney, Agent, or Firm—Robert L. Troike; Frederick J. Telecky, Jr.

(57) ABSTRACT

Enhancement of hypertext pages containing graphical images is provided by extracting 102 the ALT tag from the markup language to support selection of the corresponding hypertext link by uttering the ALT tag phrase. We describe how to add a speakable phrase for images without ALT tags. The approach also applies to client image maps that can include ALT tags for individual areas. The steps include parsing to extract possible BASE tags reference and client map (MAP tag) 102, retaining any BASE tag for relative references or, if missing, creating one using the original page reference (103) and for each anchor (A tag) containing a page reference (HREF) but without link text, and using the ALT tag text as the link text (104). In the case of a missing ALT tag, creating unique link text.

17 Claims, 8 Drawing Sheets

ENHANCEMENT OF MARKUP LANGUAGE PAGES TO SUPPORT SPOKEN QUERIES

This application claims priority under 35USC § 119(e)(1) of provisional application No. 60/073,826, filed Feb. 5, 1998.

COPYRIGHT

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

TECHNICAL FIELD OF THE INVENTION

This invention relates to markup pages and more particularly to enhancement of markup pages to support spoken queries.

BACKGROUND OF THE INVENTION

A system has been described whereby users of hypertext browsers may speak the hinks in hypertext documents using a dynamic-grammar, arbitrary-vocabulary, speaker-independent, continuous speech recognizer. See the following references: Hemphill, Charles T. and Thrift, Philip R., "Surfing the Web by Voice," *Proceeding of Multimedia '95*, No. 5–9, San Francisco, Calif. Philip R. Thrift and Charles T. Hemphill "Voice Activated World Wide Web Pages Using Grammatical Metadata (Smart Pages)", filed U.S. patent office Apr. 10, 1995, Ser. No. 08/419,229. A Protocol for adding natural language grammars to Web pages is described, which is utilized by a client-side speech recognition system to establish human to computer communication. This application is incorporated herein by reference. Charles T. Hemphill "Speaker-Independent Dynamic Vocabulary and Grammars in Speech Recognition", filed U.S. patent office: Apr. 10, 1995, U.S. Pat. No. 5,774,628. A method for dynamically creating grammars and pronunciations for arbitrary vocabulary tokens and how to incorporate them into a running, speaker-independent recognizer. This application is incorporated herein by reference. Increasingly, however, pages include more and more graphical images that do not explicitly indicate what the user might say to follow a link.

Other speech recognition systems have tried to cope with selection of graphical images by using speech commands to move the mouse. Such systems allow utterances such as "Mouse Move Up", Mouse Move Left", "Mouse Move Faster", "Mouse Move Slower", "Mouse Stop", "Mouse Click", etc. This method requires many queries and involves waiting for the mouse cursor to travel to the desired spot.

Another method divides the screen into grid areas (for example, 3 by 3) and lets the user position the mouse by selecting progressively more detailed areas. An interaction in this case might include utterances such as "Enable Grid", "Grid Area 5" (the grid reconfigures for the smaller area), "Grid Area 1" (the grid again reconfigures), "Grid Area 3", "Mouse Click". This method also requires many queries, but eliminates the wait for mouse cursor movement.

SUMMARY OF THE INVENTION

In accordance with one embodiment of the present invention, enhancement of markup pages such as hypertext pages to support spoken queries is provided whereby what to say becomes explicit and associated with a presentation. The enhancement device is coupled to a presentation means and responsive to markup language features for generating and presenting on the presentation means speech activation link queries in explicit locations with respect to the markup language features.

DESCRIPTION OF PREFERRED EMBODIMENTS OF THE PRESENT INVENTION

Figure 1:
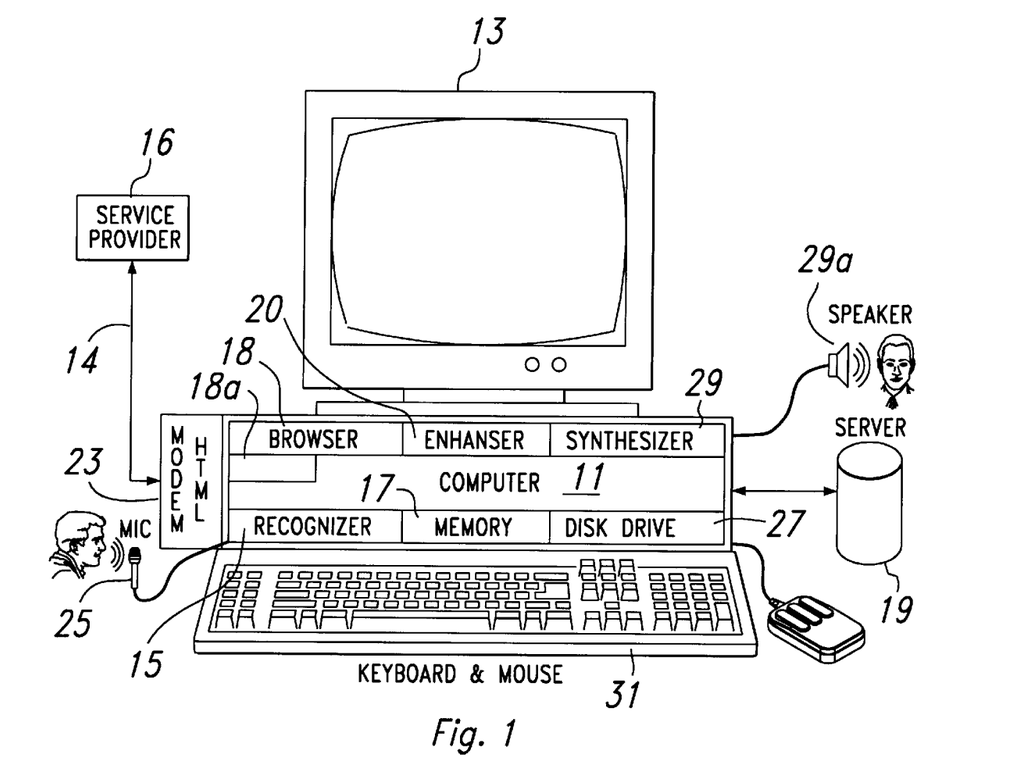
FIG. 1 is a block diagram of a system according to one embodiment of the present invention.

Referring to FIG. 1 there is illustrated a system 10 according to one embodiment of the present invention. The system includes a computer 11 with a display 13. The computer includes a voice recognizer 15, a RAM and/or ROM memory 17 and disk drive 27. The system may also be coupled to a server and database 19. The computer may include a built-in modem or an external modem 23 or an Ethernet, LAN, etc. and a browser 18. The computer 11 also includes, for example, an Internet connection 14 with, for example, a markup language page source such as any Standard Markup Language (SGML) like Hypertext Markup Language, (HTML) or Hand-held Device Markup Language (HDML) from a service provider 16 where links and destination sources are denoted by text and graphics. HTML is a collection of platform-independent styles that define parts of a World Wide Web (WWW) document. The styles are indicated by markup tags.

HTML documents are plain text ASCII files that are created by any text editor like notepad on a Windows machine. HTML tags mark the elements of a file for the browser. An element is a fundamental component of the structure of a document such as a table, heads, paragraphs and lists. Tags denote various elements in the HTML document and consist of a left angle bracket (<), a tag name, and a right angle bracket (>). The tags are normally paired to start and end an instruction. The end tag is like the start tag except a slash (/) precedes the text within the brackets. The required elements are <html>, <head>, <title> and <body> tags. HTML has six levels of heading denoted by, for example, <H1> for heading 1. A <BR> tag forces a line break with no extra (white) space between lines. A "Beginner's Guide to HTML" is available from NCSA on the Web. HTML's main usefulness is the ability to link text and/or an image to another document or section of a document. A browser highlights the identified text or image with color and/or underlines to indicate that it is a hypertext link. The hypertext-related tag is the anchor <A>. To provide an anchor one starts with <A (include space after A), specifies the document linked to by HREF= "filename" followed by closing right angle bracket (>), enters the text that will serve as the hypertext link in the current document, and enters the ending anchor tag </A>. In the example below, Maine is the hyperlink to the document Mainestats.html.

(anchor start tag symbol)HREF= "Mainestats.html">Maine(ending anchor tag symbol).

One can link to documents in other directories by specifying the relative path from the current document to the linked document. A link to a file NYstats.html located in subdirectory Atlantic States would be:

(anchor start tag symbol)HREF="Atlantic States/ NYstats.html"(ending anchor tag).

The WorldWide Web uses Uniform Resource Locations (URLS) to specify the location of resources on other servers. The URL includes the type of resource (e.g. Web, FTP, WAIS, etc.). The syntax is: scheme: 1/ host domain [:port]/ path/filename. There are also links to specific sections, links between sections of different documents, links to specific sections within the current document and a "mailto" link to make it easier for the reader to send mail to a specific person or mail alias.

Most Web browsers can display inline images next to text that are in X Bitmap (XBM), GIF or JPEG format. An example is: <IMG SRC="ImageName"> where ImageName is the URL of the image file. If the file is a GIF file then the filename ends with .gif. The <IMG> tags can tell the browser the size of the images it is downloading. The optional HEIGHT and WIDTH attributes tell the size in pixels. You can have the images separated from the text and aligned to the left or right or centered or you can have an image aligned with the text. By default the bottom of an image is aligned with the text. You can align images to the top or center of a paragraph using the ALIGN= attributes TOP and CENTER. Some browsers can not display images. The ALT attribute lets one specify text to be displayed instead of an image. For example: <IMG SRC="UpArrow.gif"ALT="up">. The UpArrow.gif is the picture of an upward pointing window.

The system 10 includes a microphone 25 for speech input with which the speaker accesses and navigates the pages and documents. The computer would include a browser 18 such as Netscape but in this case the browser 18 would be navigated by voice as taught in co-pending applications of Thrift, et al. Ser. No. 08/419,229 and Hemphill Ser. No. 08/419,226 (U.S. Pat. No. 5,774,628) cited above. A speaker 29a may also be provided and coupled to the computer 11. Computer 11 may also contain a voice synthesizer 29 to synthesize speech output. Also, optionally a keyboard and/or mouse 31 may be coupled to the computer 11 for mouse and keyboard inputs to the system 10. In accordance with one embodiment the speaker (user) navigates the pages on the display provided by the service provider over, for example, the Internet using the browser 18.

Figure 2:
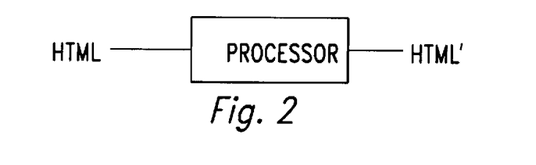
FIG. 2 is a diagram illustrating one embodiment of the present invention.

According to the present invention illustrated by FIG. 2, the present application provides a speakable page enhancer 20 program in computer 11 that takes, for example, the HTML pages and transforms them to new HTML' pages which become speech friendly by making all speakable options explicit.

Figure 3:
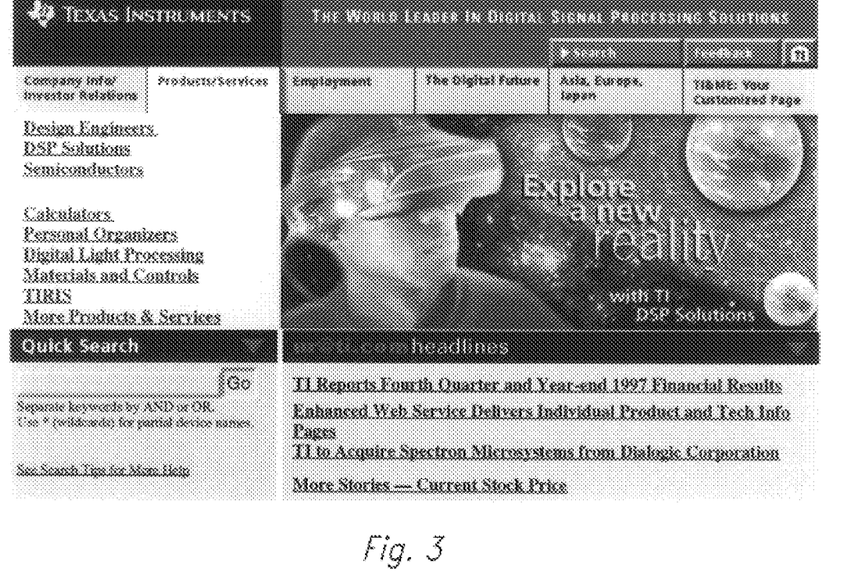
FIG. 3 illustrates an HTML page.

In one embodiment of the present invention, the speakable page enhancer 20 takes advantage of text alternative tags (ALT tags) in languages such as Hypertext Markup Language (HTML). For example, if a page contains an image (cont4g.gif) with the words "The Digital Future", the enhancer 20 extracts the ALT tag from the markup language to support selection of the corresponding hypertext link (digfuture.html) by user uttering the ALT tag phrase. The HTML follows (see FIG. 3):

(anchor start tag symbol)href="/corp/docs/digfuture, html">

<img src="/corp/graphics/nav/cont4g.gif" alt="The Digital Future">

(anchor ending tag)

The ALT tag words "The Digital Future" do not appear in the page for browsers that support graphics. The hyperlink grammars for these words are created as described in application Ser. Nos. 08/419,229 of Hemphill et al entitled "Voice Activated Hypermedia System Using grammatical Metadata" filed Apr. 10, 1995 and 08/419,226 (U.S. Pat. No. 5,774,628) of Hemphill entitled "Speaker Independent Dynamic Vocabulary and Grammar in Speech Recognition" cited above and incorporated by reference to be compared with speech input at microphone 25 at recognizer 15. The computer includes a voice browser interface 18a. The voice browser interface utilizes the enhancer to create modified or enhanced pages and directs the browser 18 to display the results. The recognizer accesses the acoustic models from memory 17 and phonetic pronunciations from disk drive 27.

This approach also applies to client side image maps (graphical images divided into rectangular regions) that can also include ALT tags for the individual areas.

Unfortunately, pages can include graphical images with the following problems:

Missing ALT tag the text represented by pixels in the graphical image does not agree with ALT tag text the image contains no text (user can only guess what to say)

To overcome these problems, the enhancer 20 transforms the original hypertext page to create a new one that makes all speakable options explicit. Depending on user preferences, such a transformation might happen automatically when the browser originally presents the page or automatically at the user's request (for example, after the user says "What can I say?"). This transformation parses the markup language specification (for example, HTML) so it will work with any page conforming to that specification.

Figure 4:
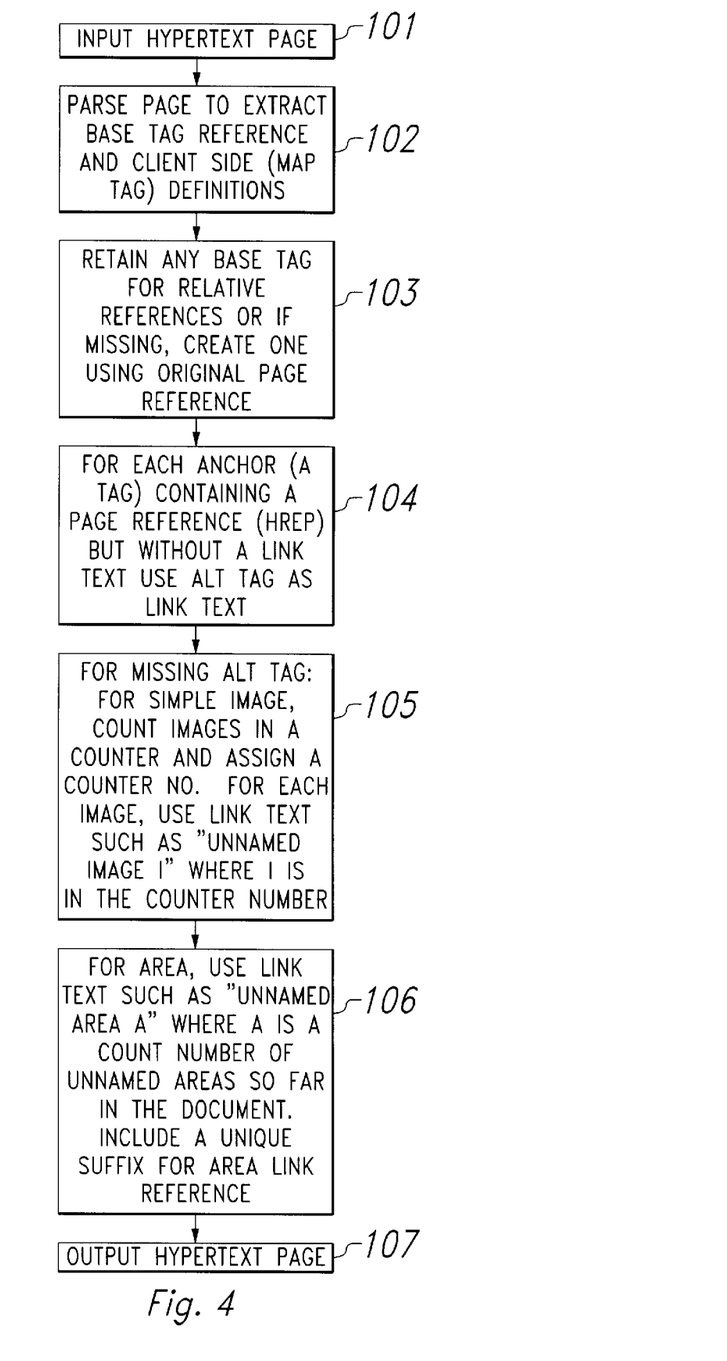
FIG. 4 illustrates a flow chart for transforming an HTML page to speakable options.

The transformation in the enhancer 20 to make speakable options explicit involves the following steps:

Input original hypertext page (Step 101 in FIG. 4).

Parse the page to extract a possible BASE tag reference and client side map (MAP tag) definitions (Step 102). To do the parsing one may use LEX or Lexical Analyzer (found in UNIX systems) for tokenization and YACC (Yet Another Compiler Compiler) also on UNIX systems which takes the tokens and applies the rules.

Retain any BASE tag for relative references or, if missing, create one using the original page reference. (Step 103)

For each anchor (A tag) containing a page reference (HREF) but without link text, use the ALT tag text as the link text. (Step 104) In the case of a missing ALT tag, create unique link text as follows:

For a simple image, use link text such as "Unnamed Image I", where I is a counter of the number of unnamed images so far in the document. (Step 105)

For an area (AREA tag), use link text such as "Unnamed Area A, where A is a counter of the number of unnamed areas so far in the document. (Step 106) In this case, also enclose a unique suffix of the area's link reference to aid in spatially aligning the newly created link with the graphical image.

(Areas are not necessarily defined in the order that they appear in the graphical image.)

Output transformed hypertext page. (Step 107)

This approach applies to HTML and any other structured hypertext markup language. We have provided HTML tags as examples above to improve clarity of the discussion.

We add the extra markup language so that we cause as little reformatting of the page as possible. In other words, the output should look close to the input, but with the extra information added to aid in voice navigation.

This approach generalized across framed documents where the image counter I and area counter A are maintained while recursively applying the transformation to subframes. In this case, link references (HREFs) in parent frames are retargeted to the corresponding transformations for the subframes.

This approach can also eliminate ambiguity within the page. A page may contain several links with the same link texts (for example, "Click Here"), but that lead to different places. In such a case, we can introduce a counter for each repeated link and transform the page to include distinct numbers for each ambiguous reference (for example, "Click Here (3)"). Utterances may then include the numbers to disambiguate the spatial ambiguity.

After creation of the transformed page, we can talk to the resulting page as we normally would using a capable voice-enabled browser.

In the simplest case, the transformation simply exposes the ALT tag to the user. The input (see FIG. 3)

Figure 5:
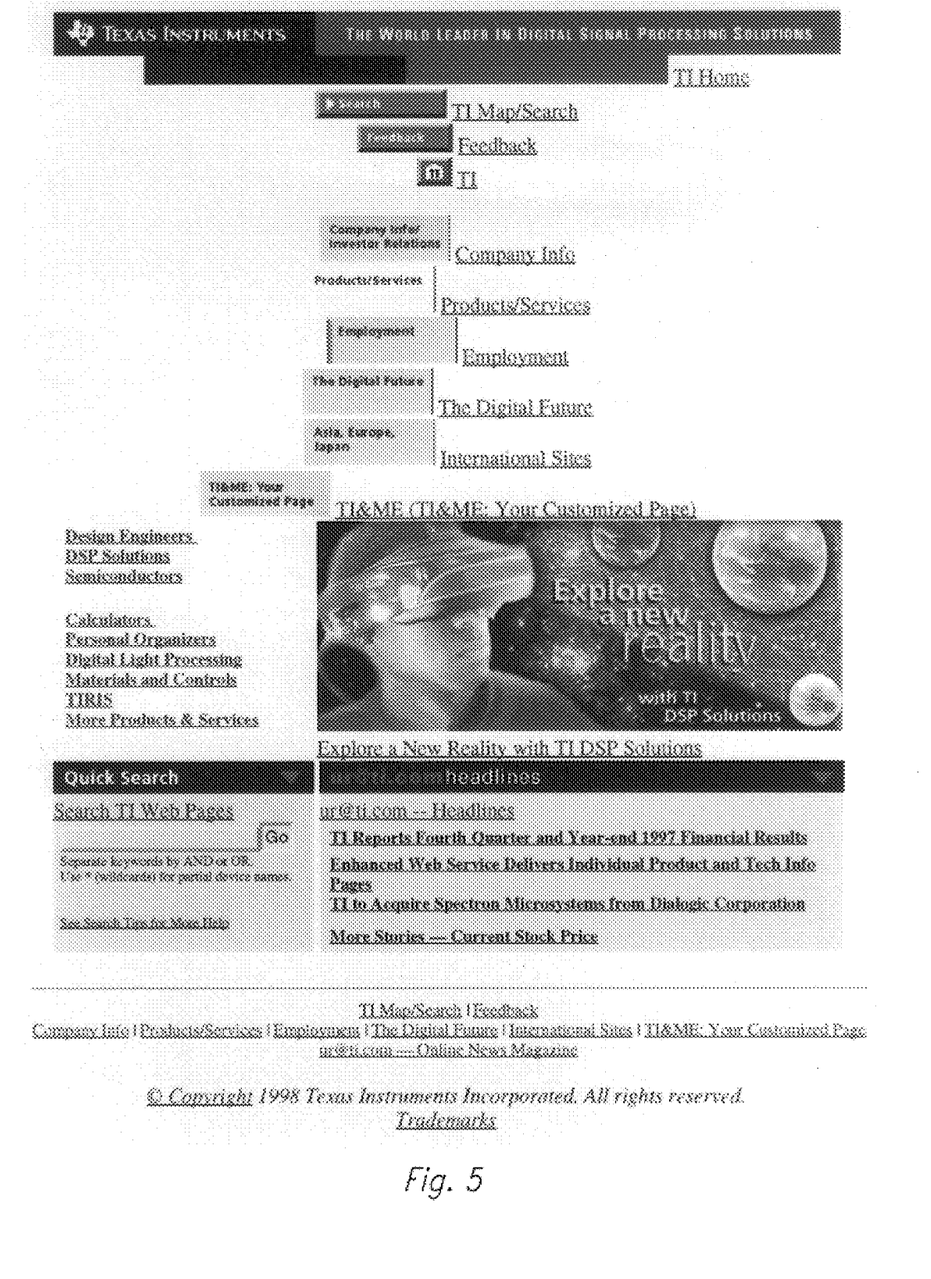
FIG. 5 illustrates a transformed HTML page from FIG. 3.

<a href="/corp/docs/companyinfo.html">
<img src="/corp/graphics/nav/contig.gif" alt="Company Info">
<a> becomes(see FIG. 5)

<a href="/corp/docs/companyinfo.html">
<img src="/corp/graphics/nav/contig.gif"alt="Company Info">
</a>
<A HREF="/corp/docs/companyinfo.html">Company Info</A><BR>

This example also illustrates the case where the text in the graphical image ("Company Info/Investor Relations") fails to match the ALT tag text. Saying the text in the graphical image results in a rejection since the recognizer has no clue about what the graphical image says. Adding the anchor (A tag) using the ALT tag text as shown above on line 4 adds the "Company Info" link that allows the user to proceed by voice. The recognizer 15 will recognize "Company Info" and the viewer is proceed by voice. The recognizer 15 will recognize "Company Info" and the viewer is given the exact words to speak. The words are placed to the right of the graphic or in some way related to in the page so the rendering of browser presents it for use. It could also be flashed on the graphic or within the graphic. The <BR> provides the break to make the space separation as shown in FIG. 5.

Figure 6:
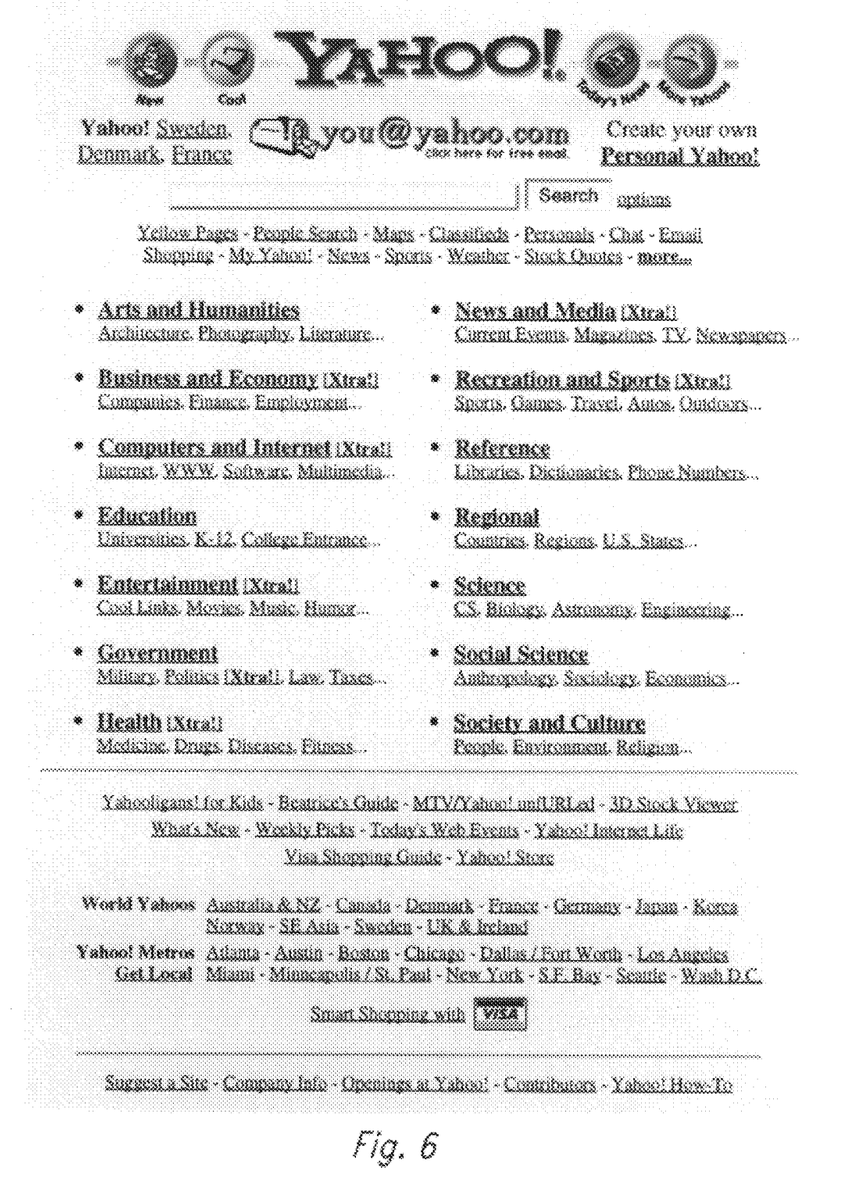
FIG. 6 illustrates another HTML page with an image without an ALT tag and with area images.
Figure 7:
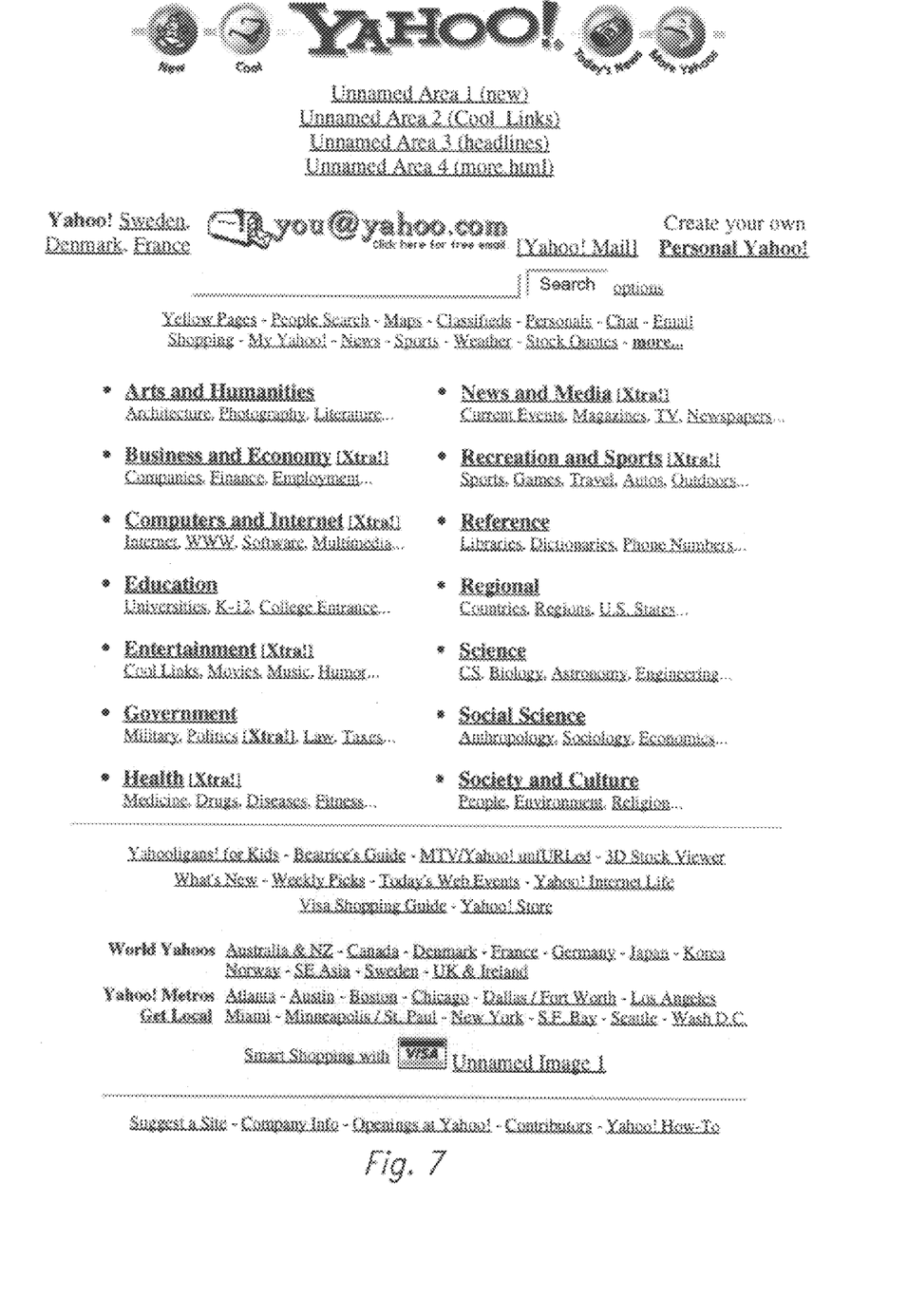
FIG. 7 illustrates a transformed HTML page from FIG. 6.

In the next case, the image definition does not include an ALT tag so we add an anchor (A tag) for the user to speak (see FIG. 6, "VISA" image):

<a href="http://shopguide.yahoo.com">
<img src="http://us.yimg.com/adv/visa/sm.gif">
</a>
<A HREF="http://shopguide.yahoo.com">Unnamed Image 1</A><BR>

In the case of area tags, we must also create some linkage between the occurrence of the created link text and the original graphical image (the area tags do not necessarily come in the proper order). The following example illustrates this (see FIG. 6, top set of images):

<a href="/bin/top3">
<img usemap="#top3" ismap src="http://us.yimg.com/images/main3.1.gif">
</a>
<—The following map may appear anywhere in the document—>
<map name="top3">
<area shape=rect coords="0,0,63,58" href="/homex/?http://www.yahoo.com/new/">
<area shape=rect coords="63,0,118,58" href="homex/?http://www.yahoo-com/Entertainment/Cool_Links/>
<area shape=rect coords="340,0,396,58" href="/homex/?http://www.yahoo.com/headlines/">
<area shape=rect coords="396,0,459,58" href="/homex/?http://www.yahoo.com/docs/family/more.html">
</map> becomes (see FIG. 4)

<a href="/bin/top3">
<img usemap="#top3" ismap src="http://us.yimg.com/images/main3.1.gif">
</a>
<BR CLEAR=ALL>
<A HREF="/homex/?http://www.yahoo com/new/">
Unnamed Area 1(new)</A><BR>
<A HREF="/homex/?http://www.yahoo.com/Entertainment/Cool_Links/">
Unnamed Area 2 (Cool_Links)</A><BR>
<A HREF="/homex/?http://www.yahoo.com/headlines/">
Unnamed Area 3 (headlines)</A><BR>
<A HREF="homes/?http://www.yahoo/com/docs/family/more.html">
Unnamed Area 4 (more.html)</A><BR>
<—Map omitted for brevity—>

The page transformation approach assumes that we have no control over the display of the browser. If, however, we are given information about the location of graphical images and links on the computer's display, then we can use an alternative presentation.

Given a page as input and information about the graphical location of elements of the page, we proceed as described above for the page transformation transformed page overlaying the needed speech information in the appropriate location on the screen.

Figure 8:
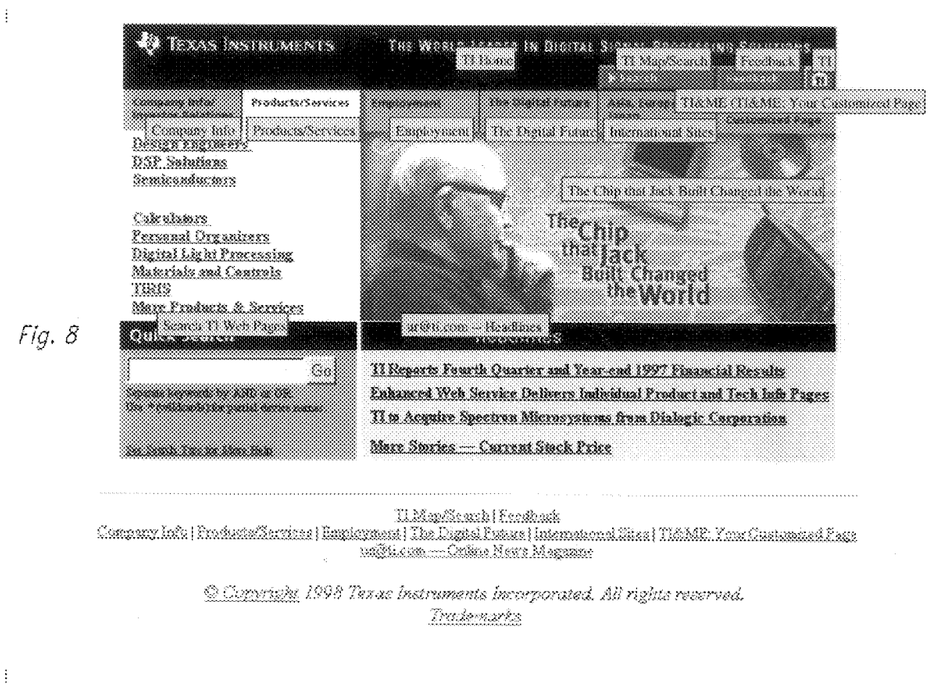
FIG. 8 illustrates a transformed HTML page with overlays.
Figure 9:
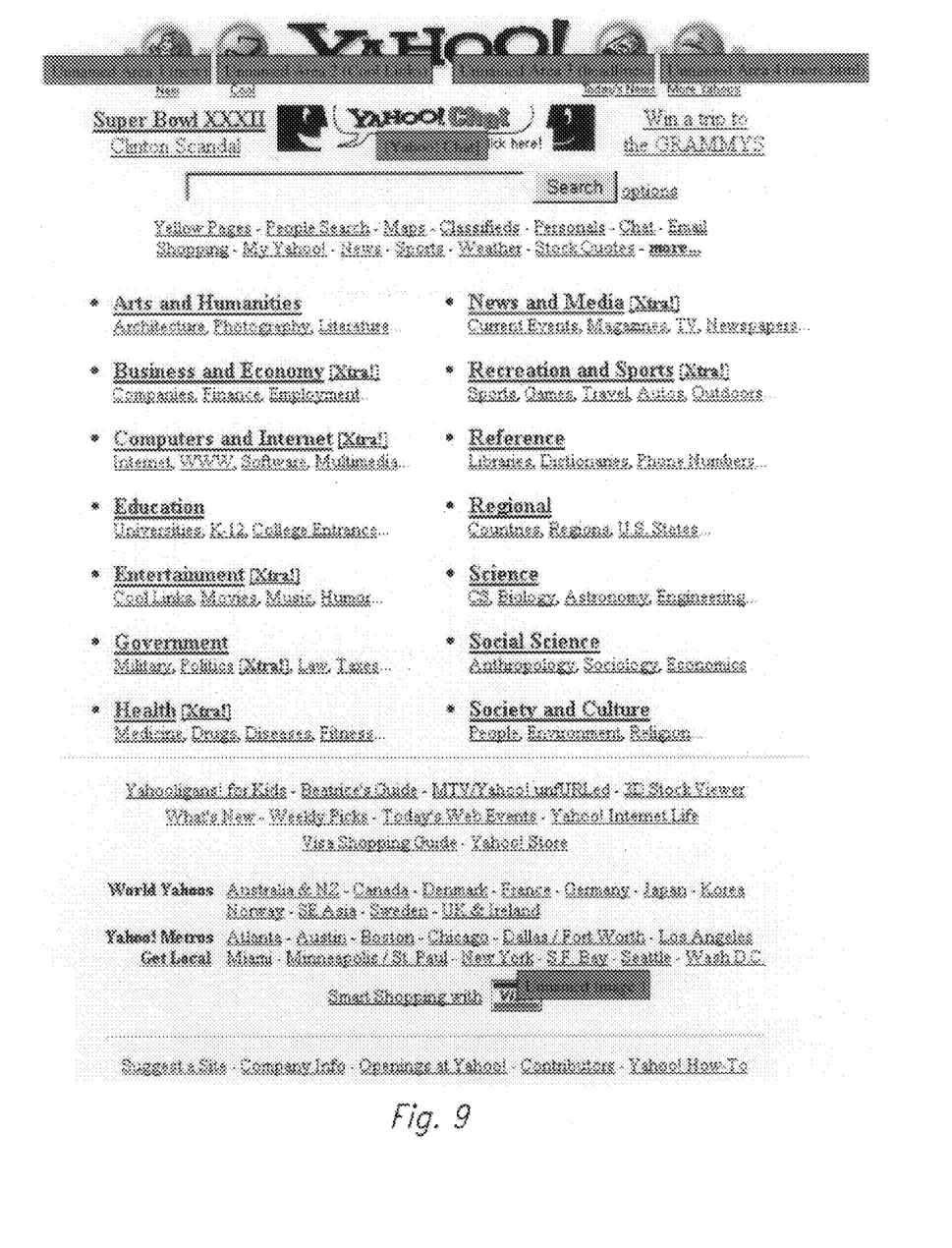
FIG. 9 illustrates a second transformed HTML page with overlays.

This approach has the advantage of minimal disruption to the original page rendering on the display. It can be selected as an automatic default option or triggered at the user's request with a phrase such as "What can I say?". This is illustrated in FIG. 8 by the boxes "Company Info", "Product/Services", etc. This is also illustrated for areas and images in FIG. 9 by the boxes "Unnamed area 1 (new)", "Unnamed area 2 (cool links)", etc. and "Unnamed Image 1".

The original HTML may be made up of a set of frames. The transformation involves keeping track of the frames and a recursive process. The transformation of the original HTML with context to a filtered HTML includes filtered versions for any frame we find and retargeted sources pointing to filtered versions of the HTML for the frames. The following processes for Transform, Recursive Process, Filter, Parse 1 and Parse 2 achieve this.

TRANSFORM: Input: URLO (fully qualified URL), FILTER_FILEO (name of a file) Output: FILTER_FILEO (contains modified HTML to expose speakable items, contains links to FRAME_FILTER_FILEi for any links to frames)

GET_HTML:
GET_HTML:
With input URLO, produce output HTMLO
PROCESS:
With input URLO, HTMLO, FILTER_FILEO, call FILTER to produce output CONTEXTO, FILTER_FILEO (contents)
Call RECURSIVE_PROCESS with CONTEXTO, URLO, CONTEXTO
RECURSIVE_PROCESS: Input: CONTEXT (for FRAME_LIST), URL, CONTEXTO (for indices) Output: Set of files FRAME_FILTER_FILEi for each FRAME_URLi, FRAME_FILEi pair in from FRAME_LIST in CONTEXT fully qualify FRAME_URLi with respect to PAGE_BASE in CONTEXT or URL otherwise
GET_HTML:
With input FRAME_URLi, produce output FRAME_HTMLi
PROCESS:
With input FRAME_URLi, FRAME_HTMLi, FRAME_FILTER_FILEi, CONTEXTO call FILTER to produce output FRAME_CONTEXTi, FRAME_FILTER_FILEi (contents)
Call RECURSIVE_PROCESS with FRAME_CONTEXTi, FRAME_URLi, CONTEXTO
FILTER: Input: URL, HTML, FILTER_FILE, (optional) CONTEXTO Output: CONTEXT, FILTER_FILE (contents)
Create a CONTEXTO if needed with 0 for AREA_INDEX, IMAGE_INDEX, and FRAME_INDEX
With HTML, CONTEXTO call parse1 to produce MAP_LIST, PAGE_BASE
If no PAGE_BASE, use URL as PAGE_BASE
With HTML, PAGE_BASE, MAP_LIST, FILTER_FILE, CONTEXTO call parse2 to produce CONTEXT, FILTER_FILE (contents)
If CONTEXTO created above, copy AREA_INDEX, IMAGE_INDEX, and FRAME_INDEX to CONTEXT.
parse1: Input: HTML, CONTEXTO Output: MAP_LIST, PAGE_BASE MAP_LIST is initially empty for each tag in HTML
If we find a MAP tag,
make AREA_LIST consisting of the set of HREF, ALT, and TARGET tags for each AREA tag
if no ALT tag, create one such as "unnamed area AREA_INDEX (HREF_SUFFIX)" where AREA_INDEX comes from CONTEXTO and is then incremented; HREF_SUFFIX consists of an interesting suffix of the HREF in the AREA tag
add the map name with the corresponding AREA_LIST to MAP_LIST
If we find a BASE tag, return the HREF as the PAGE_BASE
parse2: Input: HTML, PAGE_BASE, MAP_LIST, FILTER_FILE, CONTEXTO Output: CONTEXT, FILTER_FILE (contents) FRAME_LIST in CONTEXT is initially empty Set PAGE_BASE for CONTEXT for each tag in HTML, print as described below to FILTER_FILE End of HEAD tag, print end of HEAD tag followed by
<BASE HREF="PAGE_BASE">
If A tag with HREF tag, ALT tag and an IMG (image) link (but no text link), print the following after printing the current A tag:
<A HREF="HREF tag value">ALT tag value</A>
If A tag with HREF tag, no ALT tag and an IMG (image) link (but no text link), print the following after printing the current A tag:
<A HREF="HREF tag value">Unnamed image IMAGE_INDEX</A>
where IMAGE_INDEX comes from CONTEXTO and is incremented after.
If MAP tag, print the MAP tag and all values, find the AREA_LIST corresponding to the MAP name and for each MEMBER of AREA_LIST print (TARGET optional)
<A HREF="HREF of MEMBER" TARGET="TARGET of MEMBER">ALT text of MEMBER</A>
If FRAME tag
Create FILTER_FILE_NEW consisting of FILTER_FILE and FRAME_INDEX from CONTEXTO and increment FRAME_INDEX in CONTEXTO
Print the FRAME tag, but replace the value of SRC with FILTER_FILE_NEW
Add the original URL from the SRC tag and FITLER_FILE_NEW to the FRAME_LIST in CONTEXT
Otherwise, print the tag and arguments as normal.
For the italicized phrases the values for the phrases should be used.

While the above process is described in connection with a display, the system can also be used, for example, with a telephone system where in place of the display 13 the presentation is via a speech synthesizer 29 and a speaker 29*a* indicating a link and the markup language is HDML and the enhancer 20 generates and presents via the speech synthesizer 29 and speaker 29*a* speech activation link queries in explicit locations with respect to the synthesized audio output context from the speaker 29*a*.

Although the present invention and its advantages have been described in detail, it should be understood that various changes, substitutions and alterations can be made herein without departing from the spirit and scope of the invention as defined by the appended claims.

What is claimed is:

1. An apparatus for providing enhancement of markup pages to support spoken queries comprising:
   a coupling means for providing a source of markup language with markup language features indicating a link;
   a presentation means for indicating a link coupled to said coupling means; and
   a markup language enhancer coupled to said presentation means and responsive to said markup language features for generating and presenting on said presentation means speech activation link queries in explicit locations with respect to said markup language features.

2. The apparatus of claim 1 wherein said markup language is hypertext and said link is a hypertext link.

3. The apparatus of claim 1 wherein said markup language is HTML.

4. The apparatus of claim 3 wherein said enhancer includes means for extracting ALT tags from the hypertext language to support section of the corresponding hypertext link and putting the ALT tag words adjacent to the presentation feature.

5. The apparatus of claim 4 wherein said enhancer includes means for parsing said HTML page to extract a base tag reference and client side map definitions and if the base tag reference is missing means for creating one using an original page reference.

6. The apparatus of claim 5 wherein said means for creating includes an image index for counting the number of unnamed images and associating a link with the numbered image and for an unnamed area an area index for counting the number of unnamed areas and associating a link with an unnamed area.

7. The apparatus of claim 1 wherein said markup language is HDML.

8. The apparatus of claim 1 wherein said presentation means includes a voice synthesizer and a speaker.

9. The apparatus of claim 8 wherein said markup language is HDML.

10. The combination of claim 1 wherein said enhancer operates recursively on pages containing frames by enhancing an initial page, but replacing page references to subframes by pointing to a file containing the enhanced markup language for the subframe.

11. An apparatus comprising:
a coupler for providing a source of markup language with markup language features indicating a link;
a graphical display coupled to said coupler for displaying said markup language features indicating a link; and
a markup language enhancer coupled to said display and responsive to said markup language feature for generating and displaying on said graphical display speech activation link queries in explicit locations with respect to said markup language display features.

12. The combination of claim 11 wherein said markup language is hypertext and said link is a hypertext link.

13. The combination of claim 11 wherein said markup language is HTML.

14. The combination of claim 13 wherein said enhancer includes means for extracting ALT tag from the hypertext language to support section of the corresponding hypertext link and putting the ALT tag words adjacent to the graphic feature.

15. The combination of claim 14 wherein said enhancer includes means for parsing said HTML page to extract a base tag reference and client side map definitions and if the base tag reference is missing means for creating one using an original page reference.

16. The combination of claim 15 wherein said means for creating includes an image index for counting the number of unnamed images and associating a link with the numbered image and for an unnamed area an area index for counting the number of unnamed areas and associating a link with an unnamed area.

17. A method of enhancing markup language pages to support spoken queries comprising the steps of:
inputting hypertext pages;
parsing said pages to extract base tag references and map definitions:
retaining any base tag for relative references;
for each anchor tag containing a page reference but without link text providing ALT tag text as link text;
for a missing ALT tag creating a unique text and associating it with reference as follows:
for a simple image generating a link text with reference to a counter identifier identifying the unnamed image with respect to counting number of unnamed images,
for an area generating a link with reference to a counter identifier identifying an unnamed area with respect to counting number of unnamed areas and providing a unique suffix of the area's link reference to aid in spatially aligning the newly created link with the graphical image, and outputting the transformed hypertext page.

* * * * *